United States Patent
Leskinen et al.

(10) Patent No.: US 12,071,493 B2
(45) Date of Patent: Aug. 27, 2024

(54) POLYPROPYLENE-ULTRAHIGH-MOLECULAR-WEIGHT-POLYETHYLENE COMPOSITIONS

(71) Applicant: BOREALIS AG, Vienna (AT)

(72) Inventors: Pauli Leskinen, Porvoo (FI); Jingbo Wang, Linz (AT); Markus Gahleitner, Linz (AT); Klaus Bernreitner, Linz (AT)

(73) Assignee: BOREALIS AG, Vienna (AT)

( * ) Notice: Subject to any disclaimer, the term of this patent is extended or adjusted under 35 U.S.C. 154(b) by 730 days.

(21) Appl. No.: 17/050,038

(22) PCT Filed: May 7, 2019

(86) PCT No.: PCT/EP2019/061646
§ 371 (c)(1),
(2) Date: Oct. 23, 2020

(87) PCT Pub. No.: WO2019/215125
PCT Pub. Date: Nov. 14, 2019

(65) Prior Publication Data
US 2023/0242694 A1    Aug. 3, 2023

(30) Foreign Application Priority Data

May 9, 2018   (EP) .................... 18171575

(51) Int. Cl.
| | | |
|---|---|---|
| *C08F 210/06* | (2006.01) | |
| *C08F 2/00* | (2006.01) | |
| *C08F 4/659* | (2006.01) | |
| *C08F 4/6592* | (2006.01) | |
| *C08F 210/02* | (2006.01) | |
| *C08F 210/14* | (2006.01) | |
| *C08L 23/16* | (2006.01) | |

(52) U.S. Cl.
CPC .......... *C08F 210/06* (2013.01); *C08F 2/001* (2013.01); *C08F 4/65912* (2013.01); *C08F 4/65927* (2013.01); *C08F 210/02* (2013.01); *C08F 210/14* (2013.01); *C08L 23/16* (2013.01); *C08L 2203/18* (2013.01); *C08L 2207/068* (2013.01); *C08L 2314/06* (2013.01)

(58) Field of Classification Search
CPC .... C08F 210/06; C08F 2/001; C08F 4/65912; C08F 4/65927; C08F 210/02; C08F 210/14; C08L 23/16; C08L 2203/18; C08L 2207/068; C08L 2314/06
See application file for complete search history.

(56) References Cited

U.S. PATENT DOCUMENTS

| 6,521,709 B2 | 2/2003 | Pitteri et al. |
| 8,889,792 B2 | 11/2014 | Paavilainen et al. |
| 9,994,003 B2 | 6/2018 | Fiebig et al. |
| 2011/0104416 A1 | 5/2011 | Bernreitner et al. |
| 2011/0315264 A1 | 12/2011 | Bernreitner et al. |
| 2013/0178573 A1* | 7/2013 | Paavilainen ............ C08L 23/12 525/240 |
| 2014/0079899 A1 | 3/2014 | Bernreitner et al. |
| 2016/0168287 A1 | 6/2016 | Reichelt et al. |
| 2016/0229993 A1 | 8/2016 | Wang |
| 2017/0037165 A1* | 2/2017 | Ajellal .................. C08F 210/16 |

FOREIGN PATENT DOCUMENTS

| CN | 101003651 A | 7/2007 |
| CN | 101861339 A1 | 10/2010 |
| CN | 101889030 A | 11/2010 |
| CN | 102105499 A | 6/2011 |
| CN | 102858869 A | 1/2013 |
| CN | 103282425 A | 9/2013 |
| CN | 103298874 A | 9/2013 |
| CN | 103298875 A | 9/2013 |
| CN | 103608174 A | 2/2014 |
| CN | 105377915 A | 3/2016 |
| CN | 107001526 A | 8/2017 |
| CN | 107603031 A | 1/2018 |
| EP | 0260974 B1 | 5/1989 |
| EP | 2279216 A1 | 2/2011 |
| EP | 2787034 A1 | 10/2014 |
| JP | H10338775 A | 12/1998 |
| JP | 2001504895 A | 4/2001 |
| JP | 2002080653 A | 3/2002 |
| KR | 20110017406 A | 2/2011 |
| KR | 20110073585 A | 6/2011 |

(Continued)

OTHER PUBLICATIONS

Applicant: Borealis AG; "Polypropylene Pipe Composition"; Korean Patent Application No. 10-2020-7028883; Korean Office Action dated Nov. 4, 2021; 14 pgs.
Applicant: Borealis AG; European Patent Application No. 18171564.0; Extended European Search Report dated Nov. 22, 2018; 6 pgs.
Applicant: Borealis AG; Polypropylene Pipe Composition; Chinese Patent Application No. 201980027460.4; Chinese Office Action dated Sep. 5, 2022; 20 pgs.
John M. Griffin, et al.; "Low-load rotor-synchronised Hahn-echo pulse train (RS-HEPT) 1H decoupling in solid-state NMR: factors affecting MAS spin-echo dephasing times"; Magnetic Resonance in Chemictry; Magn. Reson. Chem. 2007; 45: S198-S208; Published online in Wiley InterScience (www.interscience.wiley.com) DOI: 10.1002/mrc.2145; Oct. 16, 2007; 11 pgs.

(Continued)

*Primary Examiner* — Shane Fang
(74) *Attorney, Agent, or Firm* — Tarolli, Sundheim, Covell & Tummino LLP

(57) ABSTRACT

PP/UHMW-PE (Polypropylene-Ultrahigh-Molecular-Weight-Polyethylene) composition having: —a melting temperature Tm in the range of 125 to 150° C. (DSC, ISO 11357, Part 3), —an MFR2 of 0.15 to 0.60 g/10 min (2.16 kg, 230° C., ISO1133), —units derived from 1-hexene in an amount of at least 1.80 wt.-%, and —a XS according to ISO16152 of less than 5.0 wt.-% all weight percentages with respect to the total PP/UHMW-PE composition.

9 Claims, No Drawings

(56) References Cited

FOREIGN PATENT DOCUMENTS

| | | | |
|---|---|---|---|
| KR | 20140045513 A | 4/2014 | |
| WO | 199414856 A1 | 7/1994 | |
| WO | 199512622 A1 | 5/1995 | |
| WO | 199915586 A1 | 4/1999 | |
| WO | 2002002576 A1 | 1/2002 | |
| WO | 2003051934 A3 | 6/2003 | |
| WO | 2003/086724 A1 | 10/2003 | |
| WO | 2006069733 A1 | 7/2006 | |
| WO | 2006097497 A1 | 9/2006 | |
| WO | 2007116034 A1 | 10/2007 | |
| WO | 2009144166 A1 | 12/2009 | |
| WO | 2010052260 A1 | 5/2010 | |
| WO | 2010052263 A1 | 5/2010 | |
| WO | 2010052264 A1 | 5/2010 | |
| WO | 2011/042361 A1 | 4/2011 | |
| WO | 2011076780 A1 | 6/2011 | |
| WO | 2011131639 A1 | 10/2011 | |
| WO | 2011135004 A2 | 11/2011 | |
| WO | 2012001052 A3 | 3/2012 | |
| WO | 2012084961 A1 | 6/2012 | |
| WO | 2013007650 A1 | 1/2013 | |
| WO | 2014060540 A1 | 4/2014 | |
| WO | 2014060541 A1 | 4/2014 | |
| WO | 2015/011135 A1 | 1/2015 | |
| WO | 2015011135 A1 | 1/2015 | |
| WO | 2015158790 A2 | 10/2015 | |

OTHER PUBLICATIONS

M. Pollard; et al.,; "Observation of Chain Branching in Polyethylene in the Solid State and Melt via 13C NMR Spectroscopy and Melt NMR Relaxation Time Measurements"; Macromolecules 2004, 37, Sep. 17, 2003; 13 pgs.

Matthew Parkinson, et al.; "Effect of Branch Length on 13C NMR Relaxation Properties in Molten Poly[ethyleneco-(a-olefin)] Model Systems"; Macromolecular Chemistry and Physics; InterScience; vol. 208, Issue19-20; DOI: 10.1002/macp.200700209; Oct. 24, 2007; 6 pgs.

Patrice Castignolles, et al.; "Detection and quantification of branching in polyacrylates by size-exclusion chromatography (SEC) and melt-state 13C NMR spectroscopy"; Polymer 50; journal homepage: www.elsevier.com/locate/polymer; Mar. 24, 2009; 11 pgs.

Xenia Filip, et al.; "Heteronuclear decoupling under fast MAS by a rotor-synchronized Hahn-echo pulse train"; Communication; Journal of Magnetic Resonance; Elsevier; Jul. 21, 2005; 5 pgs.

PCT/EP2019/061601, International Preliminary Report on Patentability.

PCT/EP2019/061601, International Search Report dated Aug. 29, 2019.

Applicant: Borealis AG; "Polypropylene-Ultrahigh-Molecular-Weight-Polyethylene Composition"; Korean Application No. 10-2020-7033572; Decision to Grant a Patent, Jul. 28, 2022.

Vincenzo Busico, et al.; "Alk-1-ene Polymerization in the Presence of a Monocyclopentadienyl Zirconium(iv) Acetamidinate Catalyst: Microstructural and Mechanistic Insights"; Macromolecular Rapid Communications Journals, Wiley InterScience DOI: 10.1002/marc. 200700098; Macromol. Rapid Commun. 2007, 28, pp. 1128-1134.

H. N. Cheng, "C NMR Analysis of Ethylene-Propylene Rubberts"; Macromolecules, vol. 17, No. 10, Oct. 1, 1984; https://doi.org/10.1021/ma00140a012; 6 pgs.

Luigi Resconi, Luigi Cavallo, Anna Fait, and Fabrizio Piemontesi; "Selectivity in Propene Polymerization with Metallocene Catalysts"; Chem. Rev. 2000, 100, 4; Mar. 25, 2000; https://doi.org/10.1021/cr980469; pp. 1253-1346.

Gurmeet Singh, Ajay V. Kothari, Virendra K. Gupta; "Triad Sequence Determination of Ethylene-Propylene Copolymers—Application of Quantitative C NMR"; ScienceDirect Polymer Testing; www.elsevier.com/locate/polytest; Feb. 27, 2009; 5 pp.

Wen-Jun Wang and Shiping Zhu; "Structural Analysis of Ethylene/Propylene Copolymers Sunthesized with a Constrained Geometry Catalyst"; Macromolecules 2000; Received Dec. 9, 1999; pp. 1157-1162.

Zhe Zhou, et al.; "A new decoupling method for accurate quantification of polyethylene copolymer composition and triad sequence distribution with C NMR"; ScienceDirect www.sciencedirect.com Journal of Magnetic Resonance 187 May 23, 2007; pp. 225-233.

Patrice Castignolles, et al.; "Detection and quantification of branching in polyacrylates by size-exclusion chromatography (SEC) and melt-state C NMR spectroscopy"; Article; ScienceDirect, Polymer vol. 50, Issue 11, www.elsevier.com/locate/polymer; doi. 10.1016/j.polymer.2009.03.021; May 22, 2009; pp. 2373-2383.

Kenia Filip, et al.; "Heteronuclear decoupling under fast MAS by a rotor-synchronized Hahn-echo pulse train"; Elsevier, Journal of Magnetic Resonance, vol. 176, Issue 2, Oct. 2005, (doi:10.1016/j.jmr.2005.06.007); pp. 239-243.

Masahiro Kakugo, et al.; "C NMR Determination of Monomer Sequence Distribution in Ethylene-Propylene Copolymers Prepared with δ-TiC13-Al(C2H5%)Cl"; Macromolecules, Publication Date:Jul. 1, 1982; (https://doi.org/10.1021/ma00232a037); pp. 1150-1152.

Katja Klimke, et al.; "Optimisation and Application of Polyolefin Branch Quantification by Melt-State 13C NMR Spectroscopy"; Article; Macromolecular Chemistry and Physics; (https://doi.org/10.1002/macp.200500422); Feb. 15, 2006; pp. 382-395.

M. Pollard, et al.; "Observation of Chain Branching in Polyethylene in the Solid State and Melt via 13C NMR Spectroscopy and Melt NMR Relaxation Time Measurements"; Macromolecules 2004 37 (3), (DOI: 10.1021/ma0349130); Sep. 17, 2003; pp. 813-825.

T.M. Ushakova, et al.; "Influence of copolymer fraction composition in ultrahigh molecular weight polyethylene blends with ethylene/1-hexene copolymers on material physical and tensile properties"; Journal of Applied Polymer Science 131, 40151, Nov. 2, 2013; (doi: 10.1002/app.40151); 8 pgs.

Applicant: Borealis AG; "Polypropylene-Ultrahigh-Molecular-Weight-Polyethylene composition "; European Patent Application No. 18171575.6; Filed May 9, 2018; European Search Report; Examiner: J. Balmer; Nov. 16, 2018; 6 pgs.

Applicant: Borealis AG; "Polypropylene-Ultrahigh-Molecular_weight_polyethylene Composition"; Korean Application No. 10-2020-7033572; Notice of Reason For Rejection dated Jan. 11, 2022; 9 pgs.

Applicant: Borealis AG; "Polypropylene-ultrahigh-molecular-weight-polyethylene composition"; Chinese Application No. 201980027563.3; Chinese Office Action dated Sep. 5, 2022; 21 pgs.

Chinese Application No. 201980027536.3, Decision to Grant dated Nov. 8, 2023.

UAE Application No. P6001459/2020, Office Action dated Dec. 18, 2023.

Chinese Application No. 201980027460.4, Office Action dated Jul. 1, 2024.

* cited by examiner

POLYPROPYLENE-ULTRAHIGH-MOLECULAR-WEIGHT-POLYETHYLENE COMPOSITIONS

FIELD OF THE INVENTION

The present invention relates to polypropylene compositions suitable inter alia for pipe applications. The invention further concerns compositions as produced from single site catalysts as well as multi step polymerization processes.

BACKGROUND OF THE INVENTION

The production of UHMW PE (ultrahigh molecular weight polyethylene) products (MW>1 000 000 g/mol) is very challenging and in practice extremely limited due to the bad operability of the processes. Adding UHMW PE material for compounding is not feasible due to too different character of the materials. The dispersion of the resulting resins is bad. It has been assumed dispersion requires broad molecular weight distributions of the carrier polypropylene polymer.

As far as PP/UHMW-PE (Polypropylene-Ultrahigh-Molecular-Weight-Polyethylene) composition very little is known. WO99/15586 discloses polyolefin compositions comprising from 10 to 95% by weight of a crystalline propylene polymer (A) having a MFR value equal to or lower than 60 g/10 min., and from 5 to 90% by weight of a ultra high molecular weight polyethylene B) in form of particles having a mean particle size of from 300 to 10 μm. Component A) had a broad molecular weight distribution Mw/Mn of higher than 5.

A different class of polyethylene compositions, i.e. the carrier polymer being not polypropylene but polyethylene, i.e. the compositions being a polyethylene has been described by T. M. Ushakova, E. E. Starchak, V. G. Krasheninnikov, V. G. Grinev, T. A. Ladygina, L. A. Novokshonova: "Influence of copolymer fraction composition in ultrahigh molecular weight polyethylene blends with ethylene/1-hexene copolymers on material physical and tensile properties", J.Appl.Polym.Sci. 131 (2014) 40151.

There was still the need for a pipe polypropylene composition resulting in good stiffness and pressure resistance. There was further the need for having a process allowing the mixing of polypropylene with ultra high molecular weight polyethylene.

The present invention is based on the finding that superior pipe properties can be achieved by a PP/UHMW-PE (Polypropylene-Ultrahigh-Molecular-Weight-Polyethylene) composition having a melting temperature Tm in the range of 125 to 150° C. together with a relatively high content of units derived from 1-hexene, and a xylene soluble content of less than 5.0 wt.-%. It further has been surprisingly found that polymerization of propylene can be continued even in three reactors coupled in series and pure homo polyethylene polymer can be produced and blended in-situ.

SUMMARY OF THE INVENTION

The Present Invention Provides a
PP/UHMW-PE (Polypropylene-Ultrahigh-Molecular-Weight-Polyethylene) composition having
a melting temperature Tm in the range of 125 to 150° C. (DSC, ISO 11357/part 3),
an $MFR_2$ of 0.15 to 0.60 g/10 min (2.16 kg, 230° C., ISO1133),
units derived from 1-hexene in an amount of at least 1.80 wt.-%, and
a XS according to ISO16152 of less than 5.0 wt.-% all weight percentages with respect to the total PP/UHMW-PE composition.

The Present Invention Further Provides a
pipe comprising this PP/UHMW-PE (Polypropylene-Ultrahigh-Molecular-Weight-Polyethylene) composition.

In a Further Aspect, the Present Invention Further Provides a
process for the preparation of the PP/UHMW-PE (Polypropylene-Ultrahigh-Molecular-Weight-Polyethylene) composition according to the present invention, comprising the steps of
(a) introducing a stream of propylene and 1-hexene to the first reactor, so that the ratio of the feed rate of 1-hexene to the feed rate of propylene is from 2.0 to 4.0 mol/kmol; further introducing a stream of catalyst system to the first reactor, whereby the catalyst system includes
(i) a catalyst having the following structure

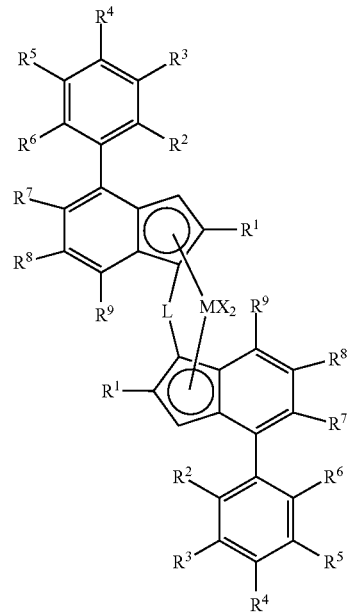

wherein
M is zirconium or hafnium;
each X independently is a sigma-donor ligand
L is a bridge of formula $-(ER^{10}_2)_y-$;
y is 1 or 2;
E is C or Si;
each $R^{10}$ is independently a $C_1-C_{20}$-hydrocarbyl group, tri($C_1-C_{20}$ alkyl)silyl group, $C_6-C_{20}$ aryl group, $C_7-C_{20}$ arylalkyl group or $C_7-C_{20}$ alkylaryl group or L is an alkylene group such as methylene or ethylene;
$R^1$ are each independently the same or are different from each other and are a $CH_2-R^{11}$ group, with $R^{11}$ being H or linear or branched $C_1-C_6$ alkyl group, $C_3-C_8$ cycloalkyl group, $C_6-C_{10}$ aryl group;
$R^3$, $R^4$ and $R^5$ are each independently the same or different from each other and are H or a linear or branched $C_1-C_6$ alkyl group, $C_7-C_{20}$ arylalkyl group, $C_7-C_{20}$ alkylaryl group, or $C_6-C_{20}$ aryl group with the proviso that if there are four or more $R^3$, $R^4$ and $R^5$ groups different from H present in total, one or more of $R^3$, $R^4$ and $R^5$ is other than tert butyl;

R⁷ and R⁸ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$, wherein $R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group, R⁹ are each independently the same or different from each other and are H or a linear or branched $C_1$-$C_6$ alkyl group; and $R^2$ and $R^6$ all are H; and (ii) a cocatalyst system comprising a boron containing cocatalyst and an aluminoxane cocatalyst polymerizing propylene and 1-hexene in the presence of the catalyst system in the first reactor to produce a first intermediate; withdrawing a product stream comprising the first intermediate from the first reactor transferring the stream comprising the first intermediate to a second reactor and further polymerizing in the second reactor the first intermediate by feeding further propylene, 1-hexene and hydrogen such that the molar ratio of the concentration of hydrogen to the concentration of propylene is in the range of 0.1 to 0.8 mol/kmol; and further the molar ratio of the concentration of 1.hexene to the concentration of propylene is in the range of 4.0 to 6.0 mol/kmol thus yielding a second intermediate and withdrawing a stream comprising the second intermediate from the second reactor (b) transferring at least a part of the stream comprising the second intermediate to a third reactor and further polymerizing ethylene in the presence of the second intermediate by introducing ethylene into the third reactor to yield the PP/UHMW-PE (Polypropylene-Ultrahigh-Molecular-Weight-Polyethylene) composition, whereby the molar ratio of the concentration of hydrogen to the concentration of ethylene is less than 500 mol/1.0×10⁶ mol.

In yet a further aspect the present invention concerns a PP/UHMW-PE (Polypropylene-Ultrahigh-Molecular-Weight-Polyethylene) composition as obtained by the inventive process as well as a pipe made from the PP/UHMW-PE (Polypropylene-Ultrahigh-Molecular-Weight-Polyethylene) composition as obtained by the inventive process.

The present invention further concerns the use of a polypropylene composition having a melting temperature Tm in the range of 125 to 150° C. (DSC, ISO 11357, part 3), and units derived from 1-hexene in an amount of at least 1.80 wt.-%, for dispersing an UHMW-PE composition having a Mw of above 1.5×10⁶ g/mol.

Ultra high molecular weight polyethylene denotes a polyethylene having a weight average molecular weight of more than 1 000 000 g/mol. Catalyst system denotes the combination of the actual catalyst and the cocatalyst(s).

Feeding no fresh catalyst system to the $2^{nd}$ and/or the $3^{rd}$ reactor (or any further reactor present) means that the catalyst system is introduced only into the first reactor.

It should be understood that the virgin catalyst system may be subjected to a prepolymerization possibly also in an external vessel. If so, the prepolymerized catalyst system must only be introduced into the first reactor but not into the second nor the third or any further reactor configured in the upstream direction.

The PP/UHMW-PE (Polypropylene-Ultrahigh-Molecular-Weight-Polyethylene) composition as described herein preferably has a melting temperature Tm in the range of 130 to 145° C., more preferably 133 to 144° C., even more preferably 135 to 143° C. and most preferably 137 to 142° C. all melting temperatures determined by DSC according to ISO 11357, part 3.

The PP/UHMW-PE (Polypropylene-Ultrahigh-Molecular-Weight-Polyethylene) composition as described herein preferably has an $MFR_2$ of 0.15 to 0.50 g/10 min (2.16 kg, 230° C., ISO1133), more preferably 0.15 to 0.40 g/10 min (2.16 kg, 230° C., ISO1133), and most preferably 0.15 to 0.30 g/10 min (2.16 kg, 230° C., ISO1133).

The PP/UHMW-PE (Polypropylene-Ultrahigh-Molecular-Weight-Polyethylene) composition as described herein preferably includes units derived from 1-hexene in an amount of at least 2.0 wt.-%, more preferably at least 2.2 and most preferably at least 2.3 wt.-%. Usually the content of units derived from 1-hexene will not exceed 3.0 wt.-%:

The PP/UHMW-PE (Polypropylene-Ultrahigh-Molecular-Weight-Polyethylene) composition as described herein preferably has a xylene soluble content XS according to ISO16152 of less than 3.5 wt.-%, more preferably less than 3.0 wt.-% and most preferably less than 2.5 wt.-%, all weight percentages with respect to the total PP/UHMW-PE composition.

The present invention can allow higher 1-hexene levels for a given melt flow rate compared with compositions not containing ultra high molecular weight polyethylene. This results in better impact. The UMHW polyethylene fraction also contributes to stiffness and pressure resistance of pipes made from the composition. It was further surprisingly found that the compositions produced had outstanding flowability. In addition to that, the inventive process also allows a higher total productivity via the use of three reactors. In yet a further aspect, the inventive process allows relatively high melt flow rates in the first and second reactor, which allows the use of higher hydrogen feeds also contributing to excellent productivity. Moreover, any remaining hexene residues may polymerize in the ultimate reactor, making product purging easier. In yet a further aspect, stable production and excellent operability were observed.

The PP/UHMW-PE (Polypropylene-Ultrahigh-Molecular-Weight-Polyethylene) composition according to the present invention preferably has units derived from ethylene in an amount of 0.5 to 15 wt.-%, more preferably 4.0 to 13 wt.-%, most preferably 5.5 to 12 wt.-%, all values with respect to the total PP/UHMW-PE composition.

As stated above the present invention also concerns a pipe comprising the PP/UHMW-PE (Polypropylene-Ultrahigh-Molecular-Weight-Polyethylene) composition of the present invention. All preferred ranges as disclosed for the PP/UHMW-PE (Polypropylene-Ultrahigh-Molecular-Weight-Polyethylene) composition shall also hold for the pipe according to the present invention comprising the PP/UHMW-PE (Polypropylene-Ultrahigh-Molecular-Weight-Polyethylene) composition.

The catalyst system as used in the present invention includes a catalyst component according to formula (I)

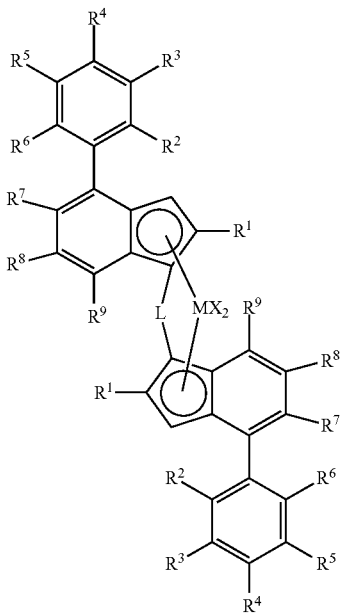

wherein
M is zirconium or hafnium;
each X independently is a sigma-donor ligand
L is a bridge of formula -$(ER^{10}_2)_y$-;
y is 1 or 2;
E is C or Si;
each $R^{10}$ is independently a $C_1$-$C_{20}$-hydrocarbyl group, tri($C_1$-$C_{20}$alkyl)silyl group, $C_6$-$C_{20}$ aryl group, $C_7$-$C_{20}$ arylalkyl group or $C_7$-$C_{20}$ alkylaryl group or L is an alkylene group such as methylene or ethylene;
$R^1$ are each independently the same or are different from each other and are a $CH_2$—$R^{11}$ group, with $R^{11}$ being H or linear or branched $C_1$-$C_6$ alkyl group, $C_3$-$C_8$ cycloalkyl group, $C_6$-$C_{10}$ aryl group;
$R^3$, $R^4$ and $R^5$ are each independently the same or different from each other and are H or a linear or branched $C_1$-$C_6$ alkyl group, $C_7$-$C_{20}$ arylalkyl group, $C_7$-$C_{20}$ alkylaryl group, or $C_6$-$C_{20}$ aryl group with the proviso that if there are four or more $R^3$, $R^4$ and $R^5$ groups different from H present in total, one or more of $R^3$, $R^4$ and $R^5$ is other than tert butyl;
$R^7$ and $R^8$ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$, wherein
$R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group,
The Catalyst System Further Includes
(ii) a cocatalyst system comprising a boron containing cocatalyst and an aluminoxane cocatalyst;

The catalyst system of the invention can be used in non-supported form or in solid form. The catalyst system of the invention may be used as a homogeneous catalyst system or heterogeneous catalyst system.

The catalyst system of the invention in solid form, preferably in solid particulate form can be either supported on an external carrier material, like silica or alumina, or, in a particularly preferred embodiment, is free from an external carrier, however still being in solid form. For example, the solid catalyst system is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Particular complexes of the invention include:
Rac-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Race-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, and
Rac-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl.

The catalysts have been described inter alia in WO2015/011135 incorporated by reference herewith. A particularly preferred catalyst is catalyst number 3. The preparation of the complex has been described in WO2013/007650 as E2. WO2013/007650 is incorporated by reference herewith.

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the complexes and hence catalysts/catalyst system of the invention can be synthesised by any process and the skilled organic chemist would be able to devise various synthetic protocols for the manufacture of the necessary ligand materials. For Example WO2007/

116034 discloses the necessary chemistry. Synthetic protocols can also generally be found in WO2002/02576, WO2011/135004, WO2012/084961, WO2012/001052, WO2011/076780 and WO2015/158790. The examples section also provides the skilled person with sufficient direction.

Cocatalyst

To form an active catalytic species it is normally necessary to employ a cocatalyst as is well known in the art.

According to the present invention a cocatalyst system comprising a boron containing cocatalyst as well as an aluminoxane cocatalyst is used in combination with the above defined complex.

The aluminoxane cocatalyst can be one of formula (X):

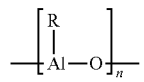

(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$alkyl, preferably $C_1$-$C_5$ alkyl, or $C_3$-$C_{10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention the aluminoxane cocatalyst is used in combination with a boron containing cocatalyst.

Boron based cocatalysts of interest include those of formula (Z)

$$BY_3 \quad (Z)$$

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate 3+ ion. Such ionic cocatalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: triethylammoniumtetra (phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst System Manufacture

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst. Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 μm, more preferably 20 to 80 μm. The use of these supports is routine in the art.

In an alternative embodiment, no support is used at all. Such a catalyst system can be prepared in solution, for example in an aromatic solvent like toluene, by contacting the metallocene (as a solid or as a solution) with the cocatalyst, for example methylaluminoxane previously dissolved in an aromatic solvent, or can be prepared by sequentially adding the dissolved catalyst components to the polymerization medium.

In one particularly preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising said catalyst, and optionally recovering said particles.

This process enables manufacturing of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934. Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The process is also industrially advantageous, since it enables the preparation of the solid particles to be carried out as a one-pot procedure. Continuous or semi continuous processes are also possible for producing the catalyst.

The inventive process for for the preparation of the PP/UHMW-PE (Polypropylene-Ultrahigh-Molecular-Weight-Polyethylene) composition as described herein, comprising the steps of a) introducing a stream of propylene and 1-hexene to the a reactor, so that the ratio of the feed rate of 1-hexene to the feed rate of propylene is from 2.0 to 4.0 mol/kmol; further introducing a stream of catalyst system to the first reactor, whereby the catalyst system includes the catalyst (i) and the cocatalyst system (ii) as described above. Preferably the ratio of the feed rate of 1-hexene to the feed rate of propylene is from 2.8 to 3.9 mol/kmol and most preferably from 2.9 to 3.8 mol/kmol.

Usually a prepolymerization will precede the polymerization in the first reactor. Operation of a prepolymerization is known in the art. The prepolymerization usually takes place at 10 to 25° C. Independent therefrom the pressure of the prepolymerization is preferably 3000 to 6000 kPa.

The catalyst system is preferably introduced into the prepolymerization reactor and transferred to the first reactor. According to the present invention it is particularly important not to introduce catalyst system to the second or third reactor. Thus, according to the present invention the stream from the prepolymerization should only enter the first reactor but should not directly enter the second or third reactor, i.e. without having passed the first reactor.

The first reactor is preferably a loop reactor.

In the first reactor propylene and 1-hexene are polymerized in the presence of the catalyst system to produce a first intermediate. The product stream comprising the first intermediate from the first reactor is then transferred to a second reactor.

The second reactor is preferably a gas phase reactor.

In the second reactor propylene and 1-hexene are polymerized in the presence of the first intermediate by feeding further propylene, 1-hexene and hydrogen into the second reactor such that the molar ratio of the concentration of hydrogen to the concentration of propylene is in the range of 0.1 to 0.8 mol/kmol; and further the molar ratio of the concentration of 1-hexene to the concentration of propylene is in the range of 4.0 to 6.0 mol/kmol.

Preferably the molar ratio of the concentration of hydrogen to the concentration of propylene is in the range of 0.2 to 0.6 mol/kmol; and further the molar ratio of the concentration of 1-hexene to the concentration of propylene is in the range of 4.5 to 5.5 mol/kmol.

The polymerization in the second reactor yields a second intermediate which is withdrawn from the second reactor and transferred to a third reactor.

The third reactor preferably is a gas phase reactor.

In the third reactor ethylene, optionally together with some carry-over propylene and/or 1-hexene, is polymerized in the presence of the second intermediate by introducing ethylene to yield the PP/UHMW-PE (Polypropylene-Ultrahigh-Molecular-Weight-Polyethylene) composition, whereby the molar ratio of the concentration of hydrogen to the concentration of ethylene is less than 500 mol/$1.0 \times 10^6$ mol. This means hydrogen is essentially absent.

Preferably the molar ratio of the concentration of hydrogen to the concentration of ethylene in the third reactor is less than 200 mol/$1.0 \times 10^6$ mol, more preferably less than 100 mol/$1.0 \times 10^6$ mol and most preferably less than 50 mol/$1.0 \times 10^6$ mol.

According to the process of the present invention, the first intermediate preferably has
  a melting temperature Tm in the range of 145 to 155° C. (DSC, ISO 11357, part 3), and/or
  an MFR2 of 0.20 to 0.55 g/10 min (2.16 kg, 230° C., ISO1133), and/or
  units derived from 1-hexene in an amount of at least 0.5 wt.-%, and/or
  units derived from 1-hexene in an amount of less than 2.5 wt.-%, and/or
  a XS measured according to ISO16152 of less than 11.0 wt.-%, and/or
  a XS measured according to ISO16152 of more than 7.5 wt.-%, In a particularly preferred embodiment, the first intermediate preferably has
  a melting temperature Tm in the range of 145 to 155° C. (DSC, ISO 11357, part 3), and
  an MFR2 of 0.20 to 0.55 g/10 min (2.16 kg, 230° C., ISO1133), and
  units derived from 1-hexene in an amount of 1.0 wt.-% to 2.5 wt.-% and
  a XS measured according to ISO16152 of 7.5 wt.-% to less than 11.0 wt.-%.

In the process according to the present invention the second intermediate preferably has
  an MFR2 of 0.25 to 0.55 g/10 min (2.16 kg, 230° C., ISO1133), and/or
  units derived from 1-hexene in an amount of at least 2.0 wt.-%.

In a particularly preferred embodiment, the second intermediate preferably has
  an MFR2 of 0.25 to 0.55 g/10 min (2.16 kg, 230° C., ISO1133), and
  units derived from 1-hexene in an amount of at least 2.0 wt.-%, even more preferably the second intermediate preferably has
  an MFR2 of 0.25 to 0.55 g/10 min (2.16 kg, 230° C., ISO1133), and/or units derived from 1-hexene in an amount of at least 2.6 wt.-%.

In a further aspect the amount of the first intermediate in the second intermediate preferably is from 41 to 49% by weight. This value is also known as split.

In yet a further aspect, the amount of the second intermediate in the PP/UHMW-PE (Polypropylene-Ultrahigh-Molecular-Weight-Polyethylene) composition is from 85 to 99.5% by weight, more preferably 90 to 98.0% by weight and most preferably 93 to 97 wt.-%. Again, this value is commonly referred to as split.

In the process according to the present invention the ratio of the MFR$_2$(second intermediate) to the MFR$_2$(final PP/UHMW-PE composition) is preferably 1.25 to 2.00.

As stated above, in the inventive process the first reactor is a loop reactor and/or the second reactor is a gas phase reactor and/or the third reactor is a gas phase reactor. Most preferably the first reactor is a loop reactor, and the second reactor is a gas phase reactor and the third reactor is a gas phase reactor.

Prepolymerization may take place in a prepolymerization vessel. A prepolymerization vessel is suitable a loop reactor. If a prepolymerization is carried out in a separate reactor, the catalyst system will be introduced into the first reactor in form of a prepolymer. However, it should be understood such prepolymer according to the present invention shall not be introduced into the second or third reactor.

The present invention further concerns the use of a polypropylene composition having
  a melting temperature Tm in the range of 125 to 150° C. (DSC, ISO 11357, part 3),
  units derived from 1-hexene in an amount of at least 1.80 wt.-%, for dispersing an UHMW-PE composition having a Mw of above $1.5 \times 10^6$ g/mol.

DETAILED DESCRIPTION

In the following several particularly preferred embodiments are described.

In a first embodiment the PP/UHMW-PE (Polypropylene-Ultrahigh-Molecular-Weight-Polyethylene) has
  a melting temperature Tm in the range of 137 to 142° C. (DSC, ISO 11357, part 3),
  an MFR$_2$ of 0.15 to 0.60 g/10 min (2.16 kg, 230° C., ISO1133),
  units derived from 1-hexene in an amount of 2.3 to 3.0 wt.-%,
  a XS according to ISO16152 of less than 2.5 wt.-%; and
  units derived from ethylene in an amount of 4.0 to 8.0 wt.-% with respect to the total PP/UHMW-PE composition.

The MFR$_2$ of 0.15 to 0.60 g/10 min (2.16 kg, 230° C., ISO1133) of the first embodiment is preferably 0.15 to 0.30 g/10 min.

The XS according to ISO16152 of the first embodiment is less than 2.0 wt.-%.

In a second embodiment the PP/UHMW-PE (Polypropylene-Ultrahigh-Molecular-Weight-Polyethylene) has
  a melting temperature Tm in the range of 137 to 143° C. (DSC, ISO 11357, part 3),
  an MFR$_2$ of 0.15 to 0.60 g/10 min (2.16 kg, 230° C., ISO1133),
  units derived from 1-hexene in an amount of 2.3 to 3.0 wt.-%,
  a XS according to ISO16152 of less than 2.5 wt.-%; and
  units derived from ethylene in an amount of 8.0 to 12 wt.-% with respect to the total PP/UHMW-PE composition.

The MFR$_2$ of 0.15 to 0.60 g/10 min (2.16 kg, 230° C., ISO1133) of the second embodiment is preferably 0.15 to 0.30 g/10 min.

The melting temperature Tm of the second embodiment is preferably in the range of 139 to 143° C. (DSC, ISO 11357, part 3).

Experimental Part

Measurement Methods:

Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma—Optical Emmision Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

In the case of analysing the elemental composition of prepolymerized catalysts, the polymeric portion is digested by ashing in such a way that the elements can be freely dissolved by the acids. The total content is calculated to correspond to the weight % for the prepolymerized catalyst.

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99.

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument Quantification of Copolymer Microstructure by NMR Spectroscopy Comonomer Determination by NMR Spectroscopy (C2)

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(I)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2.1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((I-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Comonomer Determination: Hexene Content—$^{13}$C NMR Spectroscopy

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H=I\alpha B4/2$$

The amount of 1-hexene incorporated in PHHP double consecutive sequences was quantified using the integral of the ααB4 site at 41.7 ppm accounting for the number of reporting sites per comonomer:

$$HH=2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H=(I\alpha B4-2*I\alpha\alpha B4)/2$$

The total 1-hexene content was calculated based on the sum of isolated and consecutively incorporated 1-hexene:

$$H\text{total}=H+HH$$

When no sites indicative of consecutive incorporation observed the total 1-hexeen comonomer content was calculated solely on this quantity:

$$H\text{total}=H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21=I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12=I_s\alpha\alpha+2*P21+H+HH/2$$

The total amount of propene was quantified as the sum of primary (1,2) and secondary (2,1-erythro) inserted propene:

$$P\text{total}=P12+P21=I_s\alpha\alpha+3*I\alpha\alpha 21e9+(I\alpha B4-2*I\alpha\alpha B4)/2+I\alpha\alpha B4$$

This simplifies to:

$$P\text{total}=I_s\alpha\alpha+3*I\alpha\alpha 21e9+0.5*I\alpha B4$$

The total mole fraction of 1-hexene in the polymer was then calculated as:

$$fH=H\text{total}/(H\text{total}+P\text{total})$$

The full integral equation for the mole fraction of 1-hexene in the polymer was:

$$fH=(((I\alpha B4-2*I\alpha\alpha B4)/2)+(2*I\alpha\alpha B4))/((I_s\alpha\alpha+3*I\alpha\alpha 21e9+0.5*I\alpha B4)+((I\alpha B4-2*I\alpha\alpha B4)/2)+(2*I\alpha\alpha B4))$$

This simplifies to:

$$fH=(I\alpha B4/2+I\alpha\alpha B4)/(I_s\alpha\alpha+3*I\alpha\alpha 21e9+I\alpha B4+I\alpha\alpha B4)$$

The total comonomer incorporation of 1-hexene in mole percent was calculated from the mole fraction in the usual manner:

$$H[\text{mol \%}]=100*fH$$

The total comonomer incorporation of 1-hexene in weight percent was calculated from the mole fraction in the standard manner:

$$H[\text{wt \%}]=100*(fH*84.16)/((fH*84.16)+((1-fH)*42.08))$$

Melt Flow Rate (MFR)

The melt flow rate (MFR) or melt index (MI) is measured according to ISO 1133. Where different loads can be used, the load is normally indicated as the subscript, for instance, $MFR_2$ which indicates 2.16 kg load. The temperature is selected according to ISO 1133 for the specific polymer, for instance, 230° C. for polypropylene. Thus, for polypropylene $MFR_2$ is measured at 230° C. temperature and under 2.16 kg load.

DSC Analysis, Melting Temperature (Tm) and Crystallization Temperature (Tc): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature and heat of crystallization (Hc) are determined from the cooling step, while melting temperature and heat of fusion (Hf) are determined from the second heating step.

Xylene Solubles (XS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\% = (100 \cdot m \cdot Vo)/(mo \cdot v); \ mo = \text{initial polymer amount (g)}; \ m = \text{weight of residue (g)}; \ Vo = \text{initial volume (ml)}; \ v = \text{volume of analysed sample (ml)}.$$

Catalyst Activity

The catalyst activity was calculated on the basis of following formula:

Catalyst Activity=(production rate of the polymer (kg/h))/(feed rate of the catalyst g/h)×average residence time of the polymer in the reactor (h))

Productivity

Overall productivity was calculated as $$\text{Catalyst Productivity}\left(\text{kg}-\frac{PP}{g}\right) = \frac{\text{production rate of the polymer }\left(\frac{\text{kg}}{h}\right)}{\text{feed rate of the catayst }\left(\frac{g}{h}\right)}$$

For both the catalyst activity and the productivity the catalyst loading is either the grams of prepolymerized catalyst or the grams of metallocene present in that amount of prepolymerized catalyst.

The composition of the catalysts (before the off-line prepolymerization step) has been determined by ICP as described above. The metallocene content of the prepolymerized catalysts has been calculated from the ICP data as follows:

$$\frac{Al}{Zr}(\text{mol}/\text{mol}) = \frac{Al(\text{wt \%}, ICP)/26,90}{Zr(\text{wt \%}, ICP)/91,22} \quad \text{Equation 1}$$

$$Zr(\text{mol \%}) = \frac{100}{\frac{Al}{Zr}(\text{mol}/\text{mol})+1} \quad \text{Equation 2}$$

$$MC(\text{wt \%, unprepol, cat}) = \quad \text{Equation 3}$$

$$\frac{100 \times (Zr, \text{mol \%} \times MwMC)}{Zr.\text{mol \%} \times MwMC - (100 - Zr.\text{mol \%}) \times MwMAO}$$

$$MC(\text{wt \%, prepolymerized cat}) = \quad \text{Equation 4}$$

$$\frac{MC(\text{wt \%. unprepolymerized cat})}{DP+1}$$

EXAMPLES

Examples were carried out in pilot scale. A three reactor process set up was used, whereby the first reactor was a loop reactor and the second and third reactors were gas phase reactors.

The catalyst abbreviated "SSC" used in the inventive examples was prepared as described in detail in WO 2015/011135 A1 (metallocene complex MC1 with methylaluminoxane (MAO) and borate (cocatalyst system) resulting in Catalyst 3 described in WO 2015/011135 A1) with the proviso that the surfactant was 2,3,3,3-tetrafluoro-2-(1,1,2,2,3,3,3-heptafluoropropoxy)-1-propanol. The metallocene complex (MC1 in WO 2015/011135 A1) was prepared as described in WO 2013/007650 A1 (metallocene E2 in WO 2013/007650 A1)."

Comparative examples used a two reactor system. For comparative example 1 15 wt.-% of a LLDPE material produced with a single site catalyst was introduced in the pelletization.

TABLE 1

| | Examples | | | | |
|---|---|---|---|---|---|
| Example | Comp. Example 1 | Comp. Example 2 | Working Example 1 | Working Example 2 | Working Example 3 |
| Product name | PPr (hexene) | PPr (hexene) | PPr (hexene) | PPr (hexene) | PPr (hexene) |
| Catalyst | SSC | SSC | SSC | SSC | SSC |
| Prepolymerisaton reactor | | | | | |
| Temp. (° C.) | 20 | 20 | 20 | 20 | 20 |
| Press. (kPa) | 4771 | 4765 | 4755 | 4763 | 4769 |

TABLE 1-continued

| Example | Comp. Example 1 | Comp. Example 2 | Working Example 1 | Working Example 2 | Working Example 3 |
|---|---|---|---|---|---|
| Catalyst system feed (g/h) | 3.7 | 3.9 | 3.8 | 3.7 | 3.5 |
| C3 feed (kg/h) | 62 | 62 | 62 | 62 | 62 |
| H2 (g/h) | 0.10 | 0.10 | 0.10 | 0.10 | 0.10 |
| 1. Reactor. loop | | | | | |
| Temp. (° C.) | 75.0 | 75.0 | 75.0 | 75.0 | 75.0 |
| Press. (kPa) | 4531.5 | 4527.0 | 4536.0 | 4536.7 | 4539.6 |
| C3 feed (kg/h) | 164.7 | 164.5 | 164.4 | 164.7 | 164.7 |
| C6 feed (kg/h) | 1.1 | 1.1 | 1.1 | 1.1 | 1.1 |
| H2 feed (g/h) | 0.2 | 0.2 | 0.2 | 0.2 | 0.2 |
| Feed H2/C3 ratio (mol/kmol) | 0.0 | 0.0 | 0.0 | 0.0 | 0.0 |
| Feed C6/C3 ratio (mol/kmol) | 3.3 | 3.3 | 3.3 | 3.3 | 3.3 |
| Production rate (kg/h) | 34.4 | 36.8 | 37.3 | 37.4 | 35.9 |
| Solid Concentration (wt.-%) | 32.6 | 33.3 | 33.2 | 34.0 | 31.6 |
| 1 and 2 reactor Polymer Split (wt.-%) | 46.7 | 42.2 | 45.7 | 42.3 | 43.6 |
| Catalyst productivity after B2 (kg/g) | 9.7 | 10.1 | 10.3 | 10.7 | 10.8 |
| Catalyst activity in B2 (kg/g h) | 24.2 | 24.8 | 25.1 | 26.6 | 26.2 |
| MFR2 (g/10 min) | 0.48 | 0.58 | 0.36 | 0.34 | 0.47 |
| Total C6 (wt.-%) | 1.3 | 1.2 | 1.4 | 1.2 | 1.3 |
| Tm (° C.) | 148.4 | 149.4 | 150.4 | 151.4 | 152.4 |
| XS (%) | 6.2 | 7.2 | 8.2 | 9.2 | 10.2 |
| Fines (%) | 5.03 | 6.03 | 7.03 | 8.03 | 9.03 |
| APS (mm) | 6.4 | 7.4 | 8.4 | 9.4 | 10.4 |
| Bulk Density (kg/m3) | 465 | 466 | 467 | 468 | 469 |
| 2. Reactor. GPR | | | | | |
| Temp. (° C.) | 80.0 | 80.0 | 80.0 | 80.0 | 80.1 |
| Press. (kPa) | 2400.0 | 2398.9 | 2400.0 | 2400.0 | 2399.9 |
| C3 feed (kg/h) | 210.4 | 207.7 | 207.1 | 207.3 | 208.9 |
| H2 feed (g/h) | 0.3 | 0.3 | 0.6 | 0.9 | 1.8 |
| C6 feed (g/h) | 2.0 | 2.3 | 2.2 | 2.9 | 3.2 |
| H2/C3 concentration ratio (mol/kmol) | 0.4 | 0.4 | 0.4 | 0.3 | 0.5 |
| C6/C3 concentration ratio (mol/kmol) | 4.9 | 5.2 | 5.2 | 5.1 | 4.9 |
| Polymer residence time (h) | 2.0 | 2.0 | 2.0 | 2.0 | 2.0 |
| Bed level (cm) | 140.0 | 139.9 | 140.0 | 140.0 | 140.4 |
| 1 and 2 reactor Polymer Split (wt.-%) | 53.3 | 57.8 | 54.3 | 57.7 | 56.4 |
| MFR2 (g/10 min) | 0.3 | 0.3 | 0.3 | 0.4 | 0.5 |
| C6 (wt.-%) | 2.3 | 2.6 | 2.6 | 2.8 | 2.8 |
| 3. Reactor. GPR | | | | | |
| Temp. (° C.) | | | 75.0 | 75.0 | 75.0 |
| Press. (kPa) | | | 2499.6 | 2500.4 | 2498.9 |
| Bed level (cm) | | | 100.1 | 100.1 | 100.0 |
| C3 feed (kg/h) | | | 0.0 | 0.0 | 0.0 |
| H2 feed (g/h) | | | 0.0 | 0.0 | 0.0 |
| C2 feed (kg/h) | | | 50.0 | 50.0 | 50.0 |
| H2/C2 concentration ratio (mol/kmol) | | | 0.0 | 0.0 | 0.0 |
| Polymer Split (wt.-%) (3$^{rd}$ reactor product vs. total) | | | 7.0 | 10.0 | 10.0 |
| MFR2 (g/10 min) | | | 0.2 | 0.2 | 0.3 |
| XS (%) | | | 1.7 | 2.0 | 1.5 |
| Catalyst productivity (kg PP/g cat) | 19.6 | 20.0 | 22.9 | 24.1 | 23.2 |

TABLE 1-continued

| Example | Comp. Example 1 | Comp. Example 2 | Working Example 1 | Working Example 2 | Working Example 3 |
|---|---|---|---|---|---|
| Final product | | | | | |
| Tcr (° C.) | 105.4 | 102.4 | 102.7 | 101.6 | 101.6 |
| Tm (° C.) | 138.4 | 137.9 | 138.5 | 140.4 | 140.4 |
| Pellet MFR2 (g/10 min) | 0.3 | 0.3 | 0.18 | 0.17 | 0.20 |
| Total C6 (wt.-%) | 2.4 | 2.5 | 2.5 | 2.6 | 2.6 |
| Total C2 (wt.-%) | | | 6 | 10.2 | 10 |
| XS (%) | 0.57 | 0.58 | 1.6 | 2.1 | 2 |
| Bulk Density (kg/m3) | 508 | 501 | 513 | 510 | 506 |
| APS (mm) | 1.32 | 1.35 | 1.56 | 1.41 | 1.48 |

The invention claimed is:

1. A process for the preparation of a PP/UHMW-PE (Polypropylene-Ultrahigh-Molecular-Weight-Polyethylene) composition having:

a melting temperature Tm in the range of 125 to 150° C. (DSC, ISO 11357, Part 3), a melt flow rate (MFR$_2$) of 0.15 to 0.60 g/10 min (2.16 kg, 230° C., ISO1133), units derived from 1-hexene in an amount of at least 1.80 wt. %, and a xylene soluble content (XS) according to ISO16152 of less than 5.0 wt. %, all weight percentages with respect to the total PP/UHMW-PE composition;

wherein the process comprises the steps of:

(a) introducing a stream of propylene and 1-hexene to a first reactor, so that the molar ratio of the feed rate of 1-hexene to the feed rate of propylene is from 2.0 to 4.0 mol/kmol; further introducing a stream of a catalyst system to the first reactor, whereby the catalyst system includes:

(i) a catalyst having the following structure;

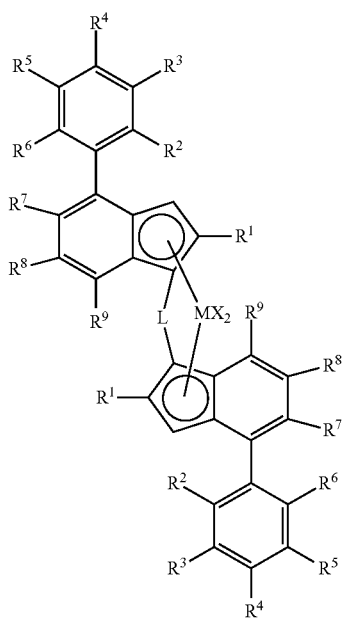

wherein;

M is zirconium or hafnium;

each X independently is a sigma-donor ligand;

L is a bridge of formula -(ER$^{10}_2$)$_y$-;

y is 1 or 2;

E is C or Si;

each R$^{10}$ is independently a C$_1$-C$_{20}$-hydrocarbyl group, tri(C$_1$-C$_{20}$ alkyl)silyl group, C$_6$-C$_{20}$ aryl group, C$_7$-C$_{20}$ arylalkyl group or C$_7$-C$_{20}$ alkylaryl group or L is an alkylene group;

R$^1$ are each independently the same or are different from each other and are a CH$_2$-R$^{11}$ group, with R$^{11}$ being H or linear or branched C$_1$-C$_6$ alkyl group, C$_3$-C$_8$ cycloalkyl group, C$_6$-C$_{10}$ aryl group;

R$^3$, R$^4$ and R$^5$ are each independently the same or different from each other and are H or a linear or branched C$_1$-C$_6$ alkyl group, C$_7$-C$_{20}$ arylalkyl group, C$_7$-C$_{20}$ alkylaryl group, or C$_6$-C$_{20}$ aryl group with the proviso that if there are four or more R$^3$, R$^4$ and R$^5$ groups different from H present in total, one or more of R$^3$, R$^4$ and R$^5$ is other than tert butyl;

R$^7$ and R$^8$ are each independently the same or different from each other and are H, a CH$_2$-R$^{12}$ group, with R$^{12}$ being H or linear or branched C$_1$-C$_6$ alkyl group, SiR$^{13}_3$, GeR$^{13}_3$, OR$^{13}$, SR$^{13}$, NR$^{13}_2$, wherein R$^{13}$ is a linear or branched C$_1$-C$_6$ alkyl group, C$_7$-C$_{20}$ alkylaryl group and C$_7$-C$_{20}$ arylalkyl group or C$_6$-C$_{20}$ aryl group, R$^9$ are each independently the same or different from each other and are H or a linear or branched C$_1$-C$_6$ alkyl group; and R$^2$ and R$^6$ all are H; and (ii) a cocatalyst system comprising a boron containing cocatalyst and an aluminoxane cocatalyst;

(iii) polymerizing propylene and 1-hexene in the presence of the catalyst system in the first reactor to produce a first intermediate; withdrawing a product stream comprising the first intermediate from the first reactor; transferring the stream comprising the first intermediate to a second reactor and further polymerizing propylene in the second reactor in the presence of the first intermediate by feeding further propylene, 1-hexene and hydrogen into the second reactor such that the molar ratio of the concentration of hydrogen to the concentration of propylene is in the range of 0.1 to 0.8 mol/kmol; and further the molar ratio of the concentration of 1-hexene to the concentration of propylene is in the range of 4.0 to 6.0 mol/kmol thus yielding a second intermediate and withdrawing a stream comprising the second intermediate from the second reactor (b) transferring at least a part of the stream comprising the second intermediate to a third reactor and further polymerizing ethylene in the presence of the second intermediate by introducing ethylene into the third reactor to yield the PP/UHMW-PE (Polypropylene-Ultrahigh-Molecular-Weight-Polyethylene) composition, whereby the molar ratio of the concentration of hydrogen to the concentration of ethylene is less than 500 mol/1.0×10$^6$ mol.

2. The process according to claim 1, comprising comprises feeding no fresh catalyst system to the second nor the third reactor.

3. The process according to claim 1, whereby the first intermediate has:
a melting temperature Tm in the range of 145 to 155° C. (DSC, ISO 11357, Part 3), and/or
an MFR$_2$ of 0.20 to 0.55 g/10 min (2.16 kg, 230° C., ISO1133), and/or
units derived from 1-hexene in an amount of at least 0.5 wt. %, and/or
units derived from 1-hexene in an amount of less than 2.5 wt. %, and/or
a XS measured according to ISO16152 of less than 11.0 wt. %, and/or
a XS measured according to ISO16152 of more than 7.5 wt. %.

4. The process according to claim 1, whereby the second intermediate has:
an MFR$_2$ of 0.25 to 0.55 g/10 min (2.16 kg, 230° C., ISO1133), and/or
units derived from 1-hexene in an amount of at least 2.0 wt. %.

5. The process according to claim 1, whereby the amount of the first intermediate in the second intermediate is from 41 to 49% by weight.

6. The process according to claim 1, whereby the amount of the second intermediate in the PP/UHMW-PE (Polypropylene-Ultrahigh-Molecular-Weight-Polyethylene) composition is from 85 to 99.5% by weight.

7. The process according to claim 1, whereby the ratio of the MFR$_2$(second intermediate)/MFR$_2$(final PP/UHMW-PE composition) is 1.25 to 2.00.

8. The process according to claim 1, whereby the first reactor is a loop reactor and/or the second reactor is a gas phase reactor and/or the third reactor is a gas phase reactor.

9. The process according to claim 1, whereby a prepolymerization precedes the first polymerization stage taking place in the first reactor.

* * * * *